J. G. EVENDEN.
Cans for Oils, &c.
No. 5,598. Reissued Oct. 14, 1873.
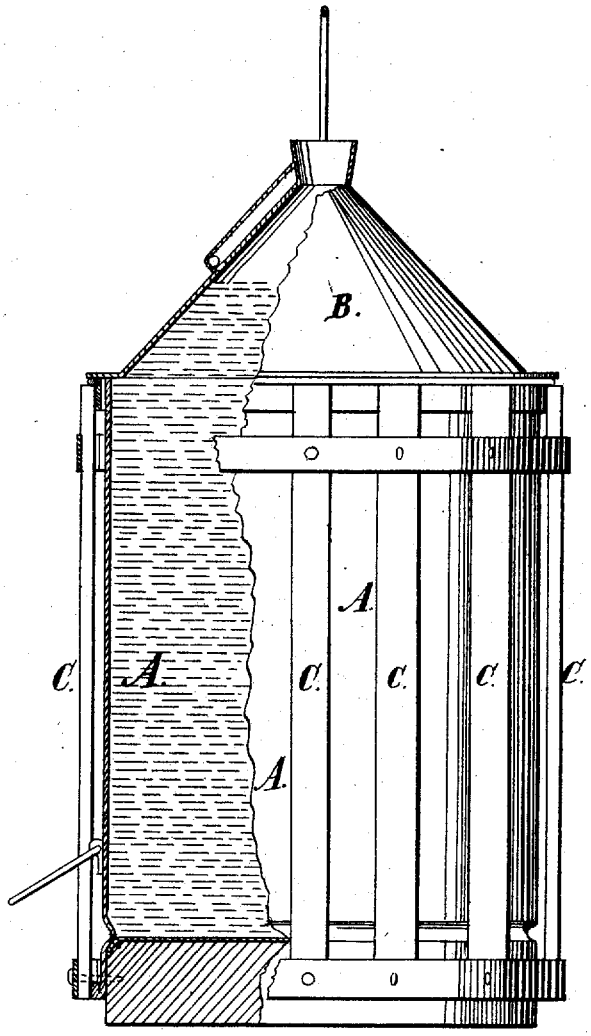
Witnesses:
F. Bartey Wilson
John W. Munday
Inventor:
John G. Evenden
AM. PHOTO-LITHOGRAPHIC Co. N.Y. (OSBORNE'S PROCESS)

UNITED STATES PATENT OFFICE.

JOHN G. EVENDEN, OF CHICAGO, ILLINOIS.

IMPROVEMENT IN CANS FOR OILS, &c.

Specification forming part of Letters Patent No. 115,943, dated June 13, 1871; reissue No. 5,598, dated October 14, 1873; application filed August 22, 1873.

DIVISION B.

*To all whom it may concern:*

Be it known that I, JOHN G. EVENDEN, of Chicago, in the county of Cook and State of Illinois, have invented certain new and useful Improvements in Sheet-Metal Cans; and I do hereby declare the following to be a full, clear, and exact description of the same, reference being had to the accompanying drawing forming part of this specification, which represents a side view, a portion of the wall at the top and bottom having been broken away to reveal the construction.

This invention consists of a sheet-metal can made with an oblique or "pitch" top, and provided with a wooden protecting-jacket, applied to the sides and bottom only of the can, leaving the oblique top uncovered. The top of the can, when made pitched, does not require protection, as its oblique shape renders it strong enough to resist injury by blows or pressure. The oblique shape prevents the piling of heavy articles upon the can when in progress of transportation, and thus, in conjunction with its guarded sides, contributes to the preservation of the can during shipment. The pitched top, in addition to this, affords the advantages common to all cans with pitch tops—namely, the better facility for pouring out its contents; and, moreover, as a shipping-can, is cheaper than those which are entirely inclosed with wood.

In the said drawing, A represents the sheet-metal can, made with a pitch top, B. C is a wooden jacket, covering the sides and bottom of the can, so as to protect said sides and bottom; but this jacket does not extend above the slope or pitch of the top; it ends where said pitch commences. This jacket C is made of a shape to conform to the outline of the can, and fits closely to said can, so as to form a part thereof, always remaining attached to it.

I am aware that flat-top cans entirely incased in wood have been heretofore made, and I therefore limit myself to a pitch-top can with only the sides and bottom incased. The pitch-top can with sides and bottom only guarded is easily and cheaply made, and is well adapted for shipment, and also for general use.

Having thus fully described my invention, that which I claim as new, and desire to secure by Letters Patent, is—

The can A B, made with a pitch top, in combination with a wooden casing or covering applied to the sides and bottom only, such casing terminating at its top where the pitch of the can commences, substantially as specified.

JOHN G. EVENDEN.

Witnesses:

F. CORTEZ WILSON,

L. L. COBURN.